(12) United States Patent
Michiyama et al.

(10) Patent No.: US 7,402,792 B2
(45) Date of Patent: Jul. 22, 2008

(54) OPTICAL SENSOR WITH ROTARY SHAFT-DRIVEN LIGHT INTERCEPTING MEMBER

(75) Inventors: Katsunori Michiyama, Toyota (JP); Takeshi Tsukamoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 87 days.

(21) Appl. No.: 11/430,012

(22) Filed: May 9, 2006

(65) Prior Publication Data

US 2006/0266939 A1  Nov. 30, 2006

(30) Foreign Application Priority Data

May 26, 2005  (JP) .............................. 2005-154335

(51) Int. Cl.
*G01D 5/34* (2006.01)

(52) U.S. Cl. .................................. 250/231.13; 250/239

(58) Field of Classification Search ........... 250/214 PR, 250/214 P, 214 R, 226, 231.13, 214 LA, 214 LS; 341/11, 13

See application file for complete search history.

(56) References Cited

U.S. PATENT DOCUMENTS 3,859,617 A * 1/1975 Oka et al. ..................... 338/15

4,849,621 A * 7/1989 Yanase et al. .......... 250/214 PR

FOREIGN PATENT DOCUMENTS

| JP | A-A08-43194 | 2/1996 |
|---|---|---|
| JP | A-H09-126886 | 5/1997 |
| JP | A-H10-90055 | 4/1998 |
| JP | A-H11-72354 | 3/1999 |
| JP | B2-3504407 | 12/2003 |

OTHER PUBLICATIONS

Notice of Preliminary Rejection from Korean Patent Office dated Apr. 17, 2007 for the corresponding Korean patent application No. 10-2006-0045842 (a copy and English translation thereof).
Notice of Preliminary Rejection dated Dec. 17, 2007 in corresponding Korean Patent Application No. 10-2006-0045842 (and English translation).
First Office Action dated Jan. 18, 2008 in corresponding Chinese Patent Application No. 200610078446.1 (and English translation).

* cited by examiner

*Primary Examiner*—Que T Le
(74) *Attorney, Agent, or Firm*—Posz Law Group, PLC (57) ABSTRACT

An optical sensor includes a light receiving device disposed in a housing, an exterior filter rotatably mounted to an attachment surface of the housing, and a light intercepting member which rotates along with a rotation of the exterior filter to adjust an amount of light incident on a light receiving surface of the light receiving device. In this optical sensor, the light intercepting member has a rotary shaft fixed at its center, and has a light adjusting mechanism for adjusting the amount of light incident on the light receiving surface of the light receiving device in a range in a direction of rotation around the rotary shaft. Accordingly, the sensitivity of the optical sensor can be arbitrarily adjusted with a high accuracy.

18 Claims, 7 Drawing Sheets

OPTICAL SENSOR WITH ROTARY SHAFT-DRIVEN LIGHT INTERCEPTING MEMBER

CROSS REFERENCE TO RELATED APPLICATION

This application is based on Japanese Patent Application No. 2005-154335 filed on May 26, 2005, the contents of which are incorporated herein by reference in its entirety.

FIELD OF THE INVENTION

The present invention relates to an optical sensor used for, for example, an automatic light system and an automatic air conditioning system of a vehicle and for detecting an amount of light emitted from the sun and the other light source.

BACKGROUND OF THE INVENTION

An optical senor described in, for example, JP-A-11-72354 has been known as this kind of conventional optical sensor. The general outline of the optical senor described in JP-A-11-72354 will be described with reference to FIG. 14 to FIG. 16B.

Figure 14:
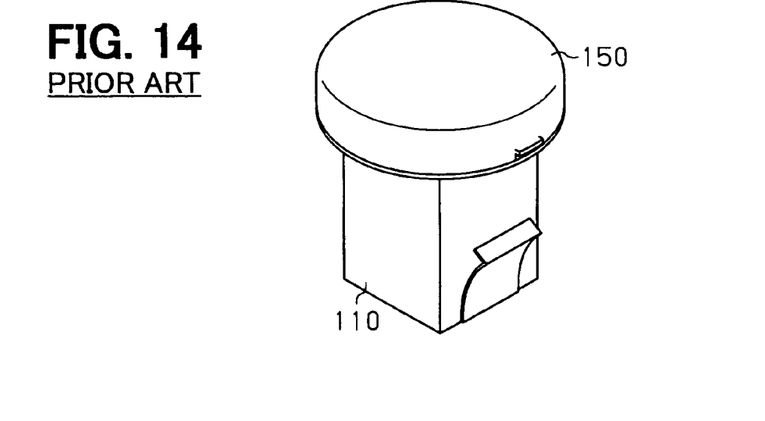
FIG. 14 is a perspective view showing the appearance of one example of a conventional optical sensor.

As shown in FIG. 14, this optical sensor is constructed of a rectangular sensor housing 110 and an exterior filter 150 formed of, for example, transparent synthetic resin and fixed on the top of the sensor housing 110. An internal structure when the inside of this exterior filter 150 is viewed from the direction of a plane is shown in FIG. 15.

Figure 15:
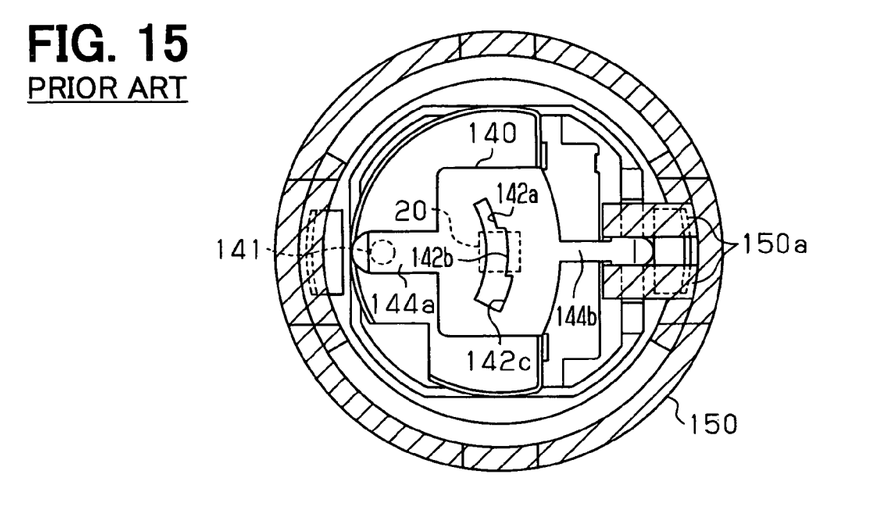
FIG. 15 is a partial cross-sectional view showing an internal structure of the conventional optical sensor.

As shown in FIG. 15, this optical sensor is basically constructed of: a light receiving device 20 mounted in the center of the top surface of the sensor housing 110 (refer to FIG. 14) and for outputting an electric signal responsive to the amount of light received; and a light intercepting plate 140 for intercepting light, which is transmitted by the exterior filter 150 and is incident on the light receiving device 20, from above the light receiving device 20 to thereby adjust the amount of light incident on the light receiving device 20. In the light intercepting plate 140 of them, a slit 142a, 142b, 142c whose width is expanded stepwise is formed in a portion that intercepts light incident on the receiving surface of the light receiving device 20. The light intercepting plate 140 has an arm 144a extended from a portion, where these slit 142a to 142c is formed, to the left in the drawing and having a rotary shaft 141 on its tip. Moreover, the light intercepting plate 140 has an arm 144b which is extended from a portion where the slit 142a to 142c is formed to the right in the drawing and whose tip is sandwiched by a protrusion 150 formed on the inside wall of the exterior filter 150.

Figure 16A:
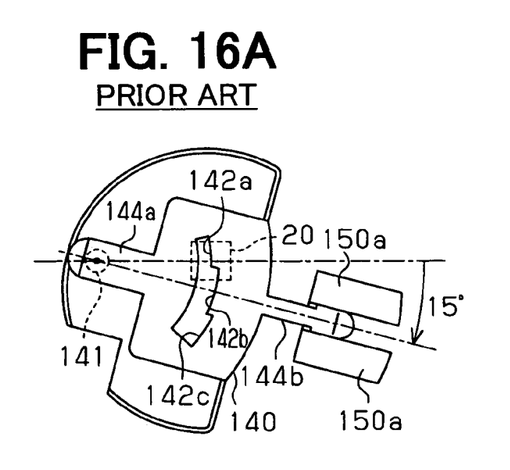
FIGS. 16A and 16B are plan views schematically showing one example of the manner of adjusting the amount of light incident on a light receiving device of the conventional optical sensor.
Figure 16B:
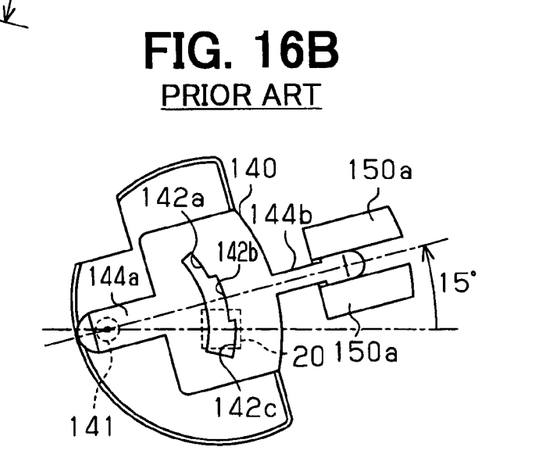

When the amount of light detected by the light receiving device 20 is adjusted, that is, when sensitivity is adjusted in this optical sensor, first, the exterior filter 150 is rotated, for example, 15 degrees clockwise. At this time, as shown in FIG. 16A and described above, the arm 144b of the light intercepting plate 140 is sandwiched by the protrusion 150a and hence the light intercepting plate 140 is also rotated 15 degrees around the rotary shaft 141 along with the rotation of the exterior filter 150. Hence, at this time, the light intercepting plate 140 is changed from a state where the light intercepting plate 140 having the slit width 142b shown in FIG. 15 intercepts light incident on the light receiving surface of the light receiving device 20 to a state where the light intercepting plate 140 having the slit width 142a intercepts light incident on the light receiving surface of the light receiving device 20, thereby a width passing the light incident on the light receiving surface of the light receiving device 20 is relatively narrowed. That is, the amount of light detected by the light receiving device 20 is made smaller than that before the rotation of the exterior filter 150, which results in decreasing sensitivity as the optical sensor. In contrast to this, when the exterior filter 150 is rotated 15 degrees counterclockwise, the light intercepting plate 140 is changed from a state where the light intercepting plate 140 having the slit width 142b shown in FIG. 15 intercepts light incident on the light receiving surface of the light receiving device 20 to a state where the light intercepting plate 140 having the slit width 142c intercepts light incident on the light receiving surface of the light receiving device 20, thereby a width passing the light incident on the light receiving surface of the light receiving device 20 is relatively expanded. That is, the amount of light detected by the light receiving device 20 is made larger than that before the rotation of the exterior filter 150, which results in increasing the sensitivity as the optical sensor.

In this manner, according to the above-mentioned conventional optical sensor, by rotating the exterior filter 150 clockwise or counterclockwise, the amount of light incident on the light receiving surface of the light receiving device 20, that is, the sensitivity of the optical sensor can be adjusted. However, although the total range of rotation in the clockwise and counterclockwise directions of the exterior filter 150 is as narrow as 30 degrees at a maximum as described above, the range of adjustment of the sensitivity of the optical sensor is wide. Hence, the degree of change in the sensitivity of the optical sensor with respect to the amount of rotation of the exterior filter 150 becomes large as a natural result.

Hence, in the case where such optical sensor is mounted in a vehicle, when the relative angle of the exterior filter 150 is changed even a little by the vibrations of the vehicle or the like, the sensitivity of the optical sensor may be excessively changed.

Moreover, even when the user rotates the exterior filter 150 a little at the time of setting sensitivity, the sensitivity of the optical sensor is changed by a large amount. Hence, it is difficult for the user to make the fine setting of sensitivity of the optical sensor.

SUMAMRY OF THE INVENTION

In view of the above-described problems, it is an object of the present invention is to provide an optical sensor having a simple structure in which sensitivity can be arbitrarily adjusted with a high accuracy.

According to an aspect of the present invention, an optical sensor includes a light receiving device disposed in a housing, an exterior filter rotatably mounted to an attachment surface of the housing, and a light intercepting member which rotates along with a rotation of the exterior filter to adjust an amount of light incident on a light receiving surface of the light receiving device. In the optical sensor, the light intercepting member has a rotary shaft fixed at its center, and has a light adjusting mechanism for adjusting the amount of light incident on the light receiving surface of the light receiving device in a range in a direction of rotation around the rotary shaft.

Therefore, in the optical sensor, resolution relating to the adjustment of sensitivity in the optical sensor with respect to the amount of rotation of the exterior filter can be effectively improved. Accordingly, even when the optical sensor is mounted to, for example, a vehicle and the relative angle of the exterior filter is changed a little by the vibration of the vehicle or the like, sensitivity of the optical sensor is never suddenly changed. Moreover, when a user sets or changes the sensitivity of the optical sensor, the user can gradually change the sensitivity of the optical sensor with respect to the amount of rotation of the exterior filter, thereby accurately setting the sensitivity of the optical sensor. As a result, the user can arbitrarily perform sensitivity adjustment with a high accuracy in the optical sensor by a simple structure.

For example, the shaft of the light intercepting member is rotatably supported on the light receiving surface of the light receiving device. Furthermore, the light adjusting mechanism can be provided in the whole range in a direction of rotation around the rotary shaft of the light intercepting member. The optical sensor can detect light by effectively using the whole range.

In the present invention, the light adjusting mechanism can be provided to adjust the amount of light incident on the light receiving surface of the light receiving device continuously or stepwise along with rotation of the light intercepting member.

For example, the light intercepting member can be provided with an opaque disk-shaped plate. In this case, the light adjusting mechanism can be constructed with a slit formed through the disk-shaped plate and for passing light such that the width of the slit is varied continuously or stepwise in a direction of rotation of the opaque disk-shaped plate.

Alternatively, the light intercepting member can be provided with a semitransparent disk-shaped film member. In this case, the light adjusting mechanism can be provided in such a manner that the film member has a degree of transparency varied continuously or stepwise in a direction of rotation of the film member.

Alternatively, the light intercepting member can be provided with a semitransparent disk-shaped resin member. In this case, the light adjusting mechanism can be provided in such a manner that the disk-shaped resin member has its thickness varied continuously or stepwise in a direction of rotation of the resin member.

Alternatively, the light intercepting member can be provided with a semitransparent dome-shaped resin member. In this case, the light adjusting mechanism can be provided in such a manner that the semitransparent dome-shaped resin member has its thickness on an inner side varied continuously or stepwise in a direction of rotation of the resin member.

Alternatively, the light intercepting member can be provided with an opaque disk-shaped plate having through holes which penetrate through the opaque disk-shaped plate to pass light. In this case, the light adjusting mechanism can be provided in such a manner that the through holes vary in a density of arrangement continuously or stepwise in a direction of rotation of the opaque disk-shaped plate.

In an example of the present invention, the rotary shaft of the light intercepting member can be fixed at a position biased from a center of rotation of the exterior filter. In this case, a radius of rotation of the exterior filter can be made larger than a radius of rotation of the light intercepting member. Furthermore, an outer peripheral surface of the light intercepting member can be made to abut against an inner peripheral surface of the exterior filter with a specified coefficient of friction between them.

Alternatively, an external gear can be provided on an outer peripheral surface of the light intercepting member, and an internal gear can be provided on an inner peripheral surface of the exterior filter. In this case, the light intercepting member rotates along with rotation of the exterior filter on the basis of engagement of the external gear with the internal gear. Furthermore, an engaging member can be elastically engaged with teeth of at least one of the external gear of the light intercepting member and the internal gear of the exterior filter, at a portion other than a portion where the external gear is engaged with the internal gear.

In another example, the light intercepting member has a center of rotation and a radius of rotation that are approximately equal to a center of rotation and a radius of rotation of the exterior filter, respectively. In this case, the whole outer peripheral surface of the light intercepting member can be made to abut against an inner peripheral surface of the exterior filter with a specified coefficient of friction between them.

Furthermore, the light intercepting member can be formed integrally with the exterior filter as an internal mechanism of the exterior filter, and the exterior filter can be rotatably mounted on a top surface of the housing.

BRIEF DESCRIPTION OF THE DRAWINGS

Additional objects and advantages of the present invention will be more readily apparent from the following detailed description of preferred embodiments when taken together with the accompanying drawings, in which:

FIG. 2A is a plan view schematically showing the relationship between a light intercepting plate and an exterior filter of the optical sensor.

FIG. 3A is a plan view schematically showing the relationship between a light intercepting plate and an exterior filter of an optical sensor.

FIG. 4A is a plan view schematically showing the relationship between a light intercepting plate and an exterior filter of an optical sensor.

FIG. 5A is a plan view schematically showing the relationship between a light intercepting plate and an exterior filter of an optical sensor.

FIG. 6A is a plan view schematically showing the relationship between a light intercepting plate and an exterior filter of an optical sensor.

FIG. 9A is a plan view schematically showing the relationship between a light intercepting plate and an exterior filter of an optical sensor.

FIG. 10A is a plan view schematically showing the relationship between a light intercepting plate and an exterior filter of an optical sensor.

FIG. 11A is a plan view schematically showing the relationship between a light intercepting plate and an exterior filter of an optical sensor.

FIG. 12A is a plan view schematically showing the relationship between a light intercepting plate and an exterior filter of an optical sensor.

FIG. 13A is a plan view schematically showing the relationship between a light intercepting plate and an exterior filter of an optical sensor.

DETAILED DESCRIPTION OF THE PREFERRED EMBODIMENTS

First Embodiment

Hereinafter, an optical sensor in accordance with the first embodiment of the present invention will be described with reference to FIG. 1 and FIGS. 2A and 2B.

In this embodiment, as described below in detail, a light intercepting plate (light intercepting member) formed of an opaque disk-shaped plate has its shaft rotatably supported on a light receiving surface of a light receiving device. This light intercepting plate has a rotary shaft fixed at its center and has a slit, formed through the light intercepting plate and for passing light. The slit is formed in such a manner that its width varies continuously in a range, for example, more than 180 degrees in the direction of rotation around the rotary shaft. Moreover, the rotary shaft of the light intercepting plate is mounted at a position biased to the center of rotation of an exterior filter and the radius of rotation of the external filter is set larger than the radius of rotation of the light intercepting plate. Furthermore, an external gear is formed on the outer peripheral surface of the light intercepting plate and an internal gear is formed on the inner peripheral surface of the exterior filter, respectively. The light intercepting plate is rotated along with the rotation of the exterior filter on the basis of the engagement of the external gear with the internal gear to thereby realize the setting or changing of sensitivity as an optical sensor with high accuracy.

Figure 1:
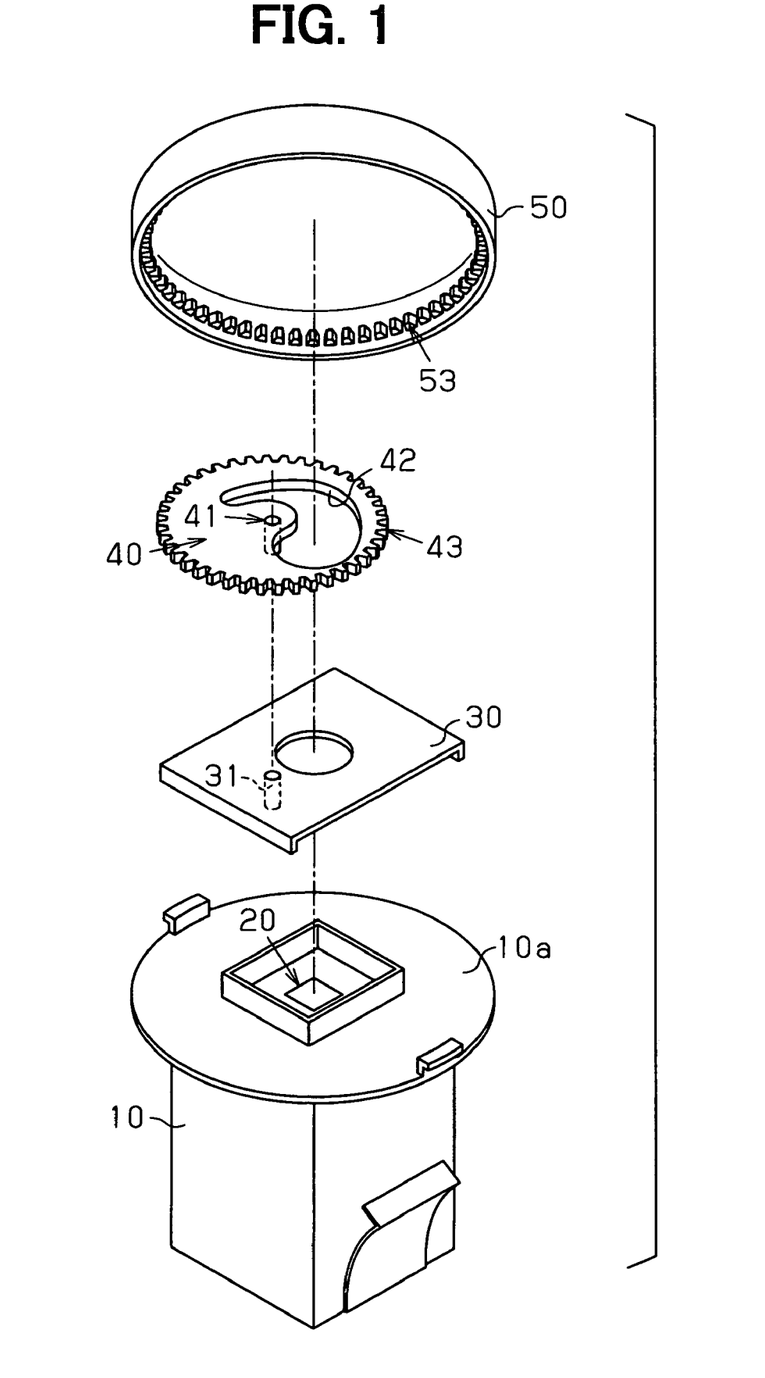
FIG. 1 is a disassembled perspective view schematically showing the structure of respective constituent elements of an optical sensor in accordance with a first embodiment of the present invention.

FIG. 1 is an exploded view showing the respective constituent elements of the optical sensor in accordance with this embodiment. FIG. 2A is a plan view schematically showing the relationship between the light intercepting plate and the exterior filter, which are used for the optical sensor, and FIG. 2B is a perspective view of the structure of the light intercepting plate. First, the construction and function of the optical sensor of this embodiment will be described in detail with reference to FIG. 1 and FIGS. 2A and 2B.

That is, the optical sensor of this embodiment is broadly constructed of: a light receiving device 20 that is arranged in the center of a top surface 10a of a sensor housing 10 shaped like a rectangular column and outputs an electric signal responsive to the amount of light incident on it; a holding plate 30 that is arranged on the top surface 10a of the sensor housing 10 and has a shaft hole 31 into which a rotary shaft 41 of a light intercepting plate (light intercepting member) 40 to be described later is inserted and a circular through hole which is formed in correspondence with the light receiving plane of the light receiving device 20 and through which light transmitted by the light intercepting plate 40 passes; the light intercepting plate 40 constructed of an opaque disk-shaped plate having a light passing slit (light adjusting mechanism) 42, formed in such a manner that its width varies continuously in a range, for example, more than 180 degrees in the direction of rotation around the rotary shaft 41 fixed in the center thereof, and an external gear 43 engaged with an internal gear 53 formed on the inner peripheral surface of an external filter 50 to be described below; and the external filter 50 that is rotatably mounted on the top of the sensor housing 10 and is formed of a transparent synthetic resin.

Figure 2A:
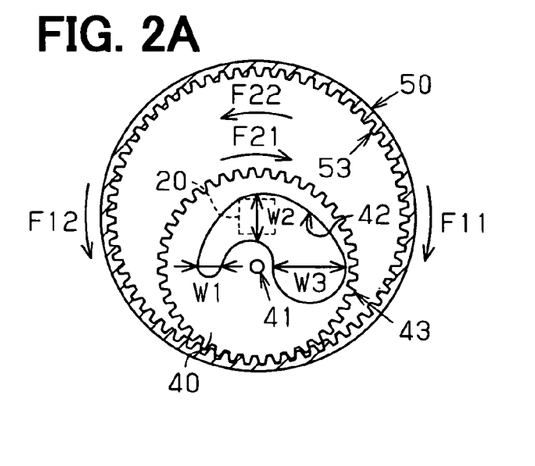

Here, as shown in FIG. 2A, the slit 42 formed in the light intercepting plate 40 is formed in a shape such that its width increases in order of W1→W2→W3 continuously around the center of the rotary shaft 41 from the left to the center and further to the right in the drawing. In the three kinds of widths W1, W2, and W3, the slit width W1 is narrower than the width of light receiving surface of the light receiving device 20, and the slit width W2 is nearly equal to the width of light receiving surface of the light receiving device 20, and the slit width W3 is wider than the width of light receiving surface of the light receiving device 20. Such slit 42 is formed in a range larger than 180 degrees in the direction of rotation F21 or F22 around the rotary shaft 41 to thereby enhance resolution relating to the adjustment of sensitivity as the optical sensor.

As shown in FIG. 2A, the external gear 43 formed on the outer peripheral surface of the light intercepting plate 40 is engaged with the internal gear 53 formed on the inner peripheral surface of the exterior filter 50 on the lower side in the drawing. Hence, for example, when the exterior filter 50 rotates in the direction of rotation F11 (clockwise), the light intercepting plate 40 is rotated along with this rotation in the direction of rotation F21 (clockwise). Conversely, when the exterior filter 50 rotates in the direction of rotation F12 (counterclockwise), the light intercepting plate 40 is rotated along with this rotation in the direction of rotation F22 (counterclockwise).

Moreover, as is evident from FIG. 2A, the radius of rotation of the exterior filter 50 is made larger than the radius of rotation of the light intercepting plate 40 and the external gear 43 is engaged with the internal gear 53. For this reason, the amount of rotation around the rotary shaft 41 of the light intercepting plate 40 is relatively larger than the amount of rotation around the center of rotation (not shown) of the exterior filter 50. Hence, a change in the sensitivity of the optical sensor with respect to the amount of rotation of the exterior filter 50 also varies significantly.

Next, the setting of sensitivity or the changing of sensitivity by the optical sensor constructed in this manner will be described.

At the time of setting or changing sensitivity by the optical sensor, the exterior filter 50 is rotated, for example, in the direction of rotation F11. At this time, the light intercepting plate 40 is rotated along with the rotation of the exterior filter 50 and hence the light intercepting plate 40 is also rotated in the direction of rotation F21, which has been described above. Hence, at this time, the light intercepting plate 40 is changed from a state where the intercepting plate 40 having the slit width W2 shown in FIG. 2A intercepts light incident on the light receiving surface of the light receiving device 20, to a state where the intercepting plate 40 having a slit width closer to the slit width W1 intercepts light incident on the light receiving surface of the light receiving device 20. That is, the amount of light detected by the light receiving device 20 is made smaller than that before the rotation of the exterior filter 50, thereby sensitivity as the optical sensor is decreased. In contrast to this, when the exterior filter 50 is rotated in the direction of rotation F12, the light intercepting plate 40 is changed from a state where the intercepting plate 40 having the slit width W2 shown in FIG. 2A intercepts light incident on the light receiving surface of the light receiving device 20 to a state where the intercepting plate 40 having a slit width closer to the slit width W3 intercepts light incident on the light receiving surface of the light receiving device 20. That is, the amount of light detected by the light receiving device 20 is made larger than that before the rotation of the exterior filter 50, thereby the sensitivity as the optical sensor is increased.

As described above, the amount of rotation of the light intercepting plate 40 is relatively larger than the amount of rotation of the exterior filter 50. Hence, a change in the sensitivity of the optical sensor with respect to the amount of rotation of the exterior filter 50 is also varied significantly. However, as described above, in the optical sensor of this embodiment, the resolution relating to the adjustment of sensitivity as the optical sensor is basically increased. Hence, an increased change in the sensitivity of the optical sensor with respect to the amount of rotation of the exterior filter 50 can strike an appropriate balance between improvement in accuracy in the adjustment of sensitivity and the securing of promptness in an adjusting operation.

As described above, according to the optical sensor of this first embodiment, the following excellent effects can be produced.

(1) The light intercepting plate 40 has the slit 42 constructing a light adjusting mechanism in a range larger than 180 degrees in the direction of rotation around the rotary shaft 41. With this, for example, the slit 42 is formed in the light intercepting plate 40 in a wide range, for example, larger than 180 degrees and hence the resolution relating to the adjustment of sensitivity or the changing of sensitivity as the optical sensor with respect to the amount of rotation of the exterior filter 50 can be significantly increased.

(2) The rotary shaft 41 of the light intercepting plate 40 is fixed at a portion biased to the center of rotation of the exterior filter 50, and the radius of rotation of the exterior filter 50 is set larger than the radius of rotation of the light intercepting plate 40. With this, the amount of rotation around the rotary shaft 41 of the light intercepting plate 40 is relatively larger than the amount of rotation around the center of rotation of the exterior filter 50. Hence, a change in the sensitivity of the optical sensor with respect to the amount of rotation of the exterior filter 50 is also increased. In addition, as in the effect described above (1), the resolution relating to the adjustment of sensitivity is basically increased, and hence an increase in sensitivity change of the optical sensor to the amount of rotation of the exterior filter 50 can strike an appropriate balance between improvement in accuracy in the adjustment of sensitivity and the securing of promptness in an adjusting operation.

(3) The slit 42 is formed in such a way as to continuously adjust the amount of light incident on the light receiving surface of the light receiving device 20 along with the rotation around the rotary shaft 41 of the light intercepting plate 40. With this, a specified relationship can be set between the degree of change in the sensitivity of the optical sensor and the amount of rotation of the exterior filter 50a. Hence, the user can set or change the sensitivity of the optical sensor continuously and easily.

(4) The light intercepting plate 40 can be formed by a simple construction in which the slit 42 is only formed in the opaque disk-shaped plate in the above-described manner. Hence, the light intercepting plate 40 can be easily realized.

Second Embodiment

Next, an optical sensor of the second embodiment in accordance with the present invention will be described with reference to FIGS. 3A and 3B. Here, a difference of the second embodiment with the above-mentioned first embodiment will be mainly described. FIG. 3A is a plan view schematically showing the relationship between a light intercepting plate 40a and the exterior filter 50, which are used for the optical sensor, and FIG. 3B is a perspective view of the structure of the light intercepting plate itself. In FIGS. 3A and 3B, the elements having the same function as shown in FIGS. 2A and 2B are denoted by the same reference symbols and the duplicate descriptions of these elements will be omitted.

Figure 2B:
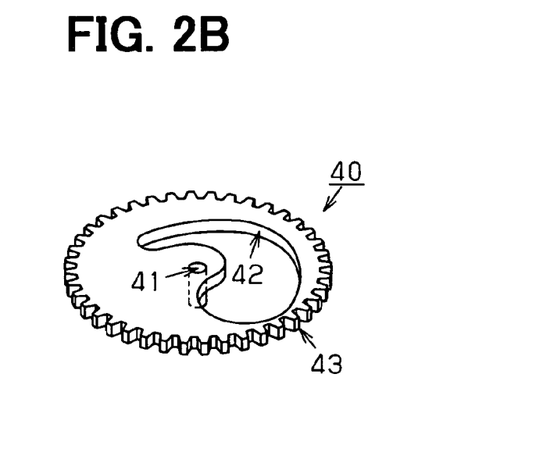
FIG. 2B is a perspective view showing the light intercepting plate of FIG. 2A, according to the first embodiment.
Figure 3A:
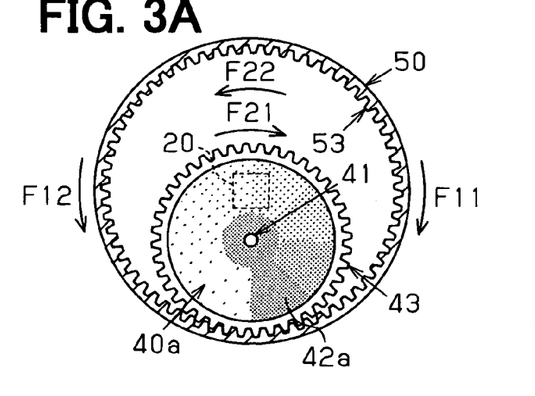
Figure 3B:
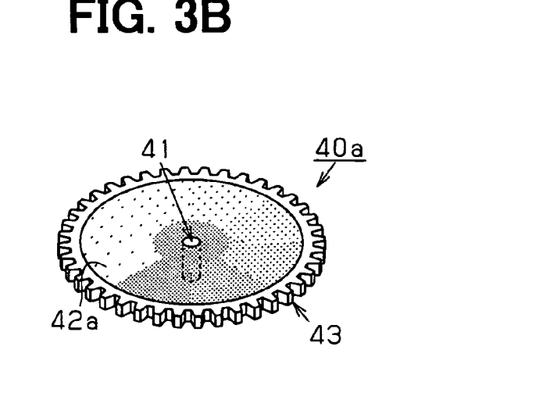
FIG. 3B is a perspective view showing the light intercepting plate of FIG. 3A, according to a second embodiment of the present invention.

As shown in these FIGS. 3A and 3B, the optical sensor of this embodiment is constructed in a manner similar to the manner in the foregoing first embodiment shown in FIG. 1 and FIGS. 2A and 2B. However, in this embodiment, as shown in FIGS. 3A and 3B, the light intercepting plate 40a is formed with a semitransparent disk-shaped film member. The film member for forming this light intercepting plate 40a has the degree of transparency set in a manner continuously varying in a whole range in the direction of rotation around its rotary shaft.

More specifically, as shown in FIG. 3A, a film member (light adjusting mechanism) 42a has the degree of transparency set highest, for example, on the lower left side in the drawing of the rotary shaft 41. Hence, in the lower left portion of the film member 42a, the amount of light passing through the film member 42a is made largest. The degree of transparency of this film member 42a is set gradually lower in a direction of arrow shown as the direction of rotation F21 from a starting point on the lower side in the drawing of the rotary shaft 41 and is set lowest on the lower right side in the drawing of the rotary shaft 41. Hence, in the lower right portion of the film member 42a, the amount of light passing though the film member 42a is made smallest. That is, the degree of transparency of the light intercepting plate 40a provided with this film member 42a is continuously varied in the manner schematically shown in FIG. 3A in the whole range according to the direction of rotation F21 or F22 around the rotary shaft 41, thereby resolution relating to the adjustment of sensitivity as the optical sensor can be increased.

Moreover, as described above, the film member 42a has the degree of transparency varied continuously in the whole range in the direction of rotation around the rotary shaft 41. Hence, the range where the degree of interception of light can be adjusted in the light intercepting plate 40a can be utilized to a maximum, thereby a wide dynamic range as the optical sensor can be secured in the optical sensor.

According to the optical sensor of this second embodiment described above, in addition to the above-mentioned effects (1) to (3) of the foregoing first embodiment, the new following effects can be produced.

(5) The light intercepting plate 40a is provided with the film member 42a constructing the light adjusting mechanism in the whole range in the direction of rotation around the rotary shaft 41 of the light intercepting plate 40a. With this, the range where the light intercepting plate 40a can be used can be utilized to a maximum extent, thereby a wide dynamic range can be secured in the optical sensor.

(6) The light intercepting plate 40a is formed of the semitransparent disk-shaped film member 42a. The light intercepting plate 40a is provided with the film member 42a having the degree of transparency set in a manner continuously varying in the direction of rotation around its rotary shaft 41. With this, along with the rotation of the light intercepting plate 40a, the amount of light incident on the light receiving surface of the light receiving device 20 can be continuously adjusted according to the degree of transparency of the film member 42a. Hence, it is possible to set or change the sensitivity as the optical sensor with ease and with high accuracy.

(7) Moreover, the use of such a film member 42a can reduce the weight of the light intercepting plate 40a, thereby reducing the weight of the optical sensor.

(8) In addition, the optical sensor is so constructed as to always receive incident light on the whole light receiving surface of the light receiving device 20. Hence, it is possible to set or change sensitivity without changing the directivity of the optical sensor.

Third Embodiment

Figure 4A:
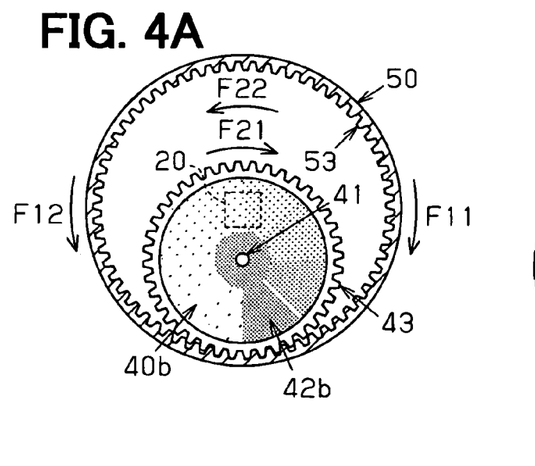

Next, an optical sensor in accordance with the third embodiment of the present invention will be described with reference to FIGS. 4A and 4B. Here, a difference of the third embodiment with the above-mentioned second embodiment will be now described. FIG. 4A is a plan view schematically showing the relationship between a light intercepting plate 40b and an exterior filter 50, which are used for the optical sensor of the third embodiment, and FIG. 4B is a perspective view of the structure of the light intercepting plate 40b.

Figure 4B:
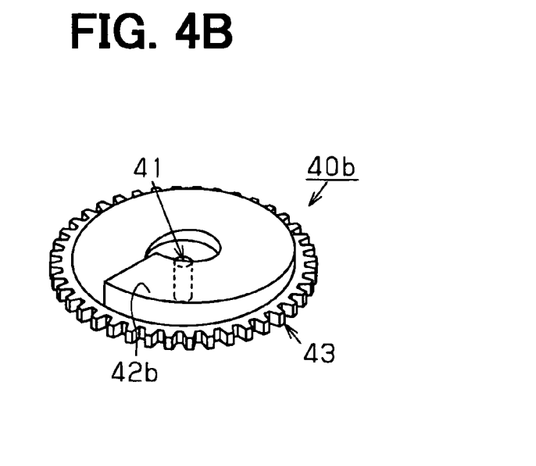
FIG. 4B is a perspective view showing the light intercepting plate of FIG. 4A, according to a third embodiment of the present invention.

As shown in FIGS. 4A and 4B, the optical sensor of this embodiment is basically constructed in a manner similar to the manner in the first embodiment shown in FIG. 1 and FIGS. 2A and 2B and in the second embodiment shown in FIGS. 3A and 3B. However, in this embodiment, as shown in FIGS. 4A and 4B, the light intercepting plate 40b is provided with a semitransparent disk-shaped resin member. The resin member forming this light intercepting plate 40b is a diffusion plate whose thickness varies continuously in the whole range in the direction of rotation around its rotary shaft.

More specifically, as shown in FIG. 4B, a diffusion plate (light adjusting mechanism) 42b is formed in such a way that its thickness varies continuously in the direction of rotation around the rotary shaft 41. Then, such a diffusion plate 42b is set in a manner shown in FIG. 4A and hence its thickness is made smallest, for example, on the lower left side in the drawing of the rotary shaft 41. Hence, in this portion, the amount of light passing through the diffusion plate 42b is made largest. The thickness of this diffusion plate 42b is made gradually larger in a direction of arrow shown as the direction of rotation F21 from a starting point on the lower side in the drawing of the rotary shaft 41 and is made largest on the lower right side in the drawing of the rotary shaft 41. Hence, in this portion, the amount of light passing though the diffusion plate 42b is made smallest. That is, also the light intercepting plate 40a provided with this diffusion plate 42b has the degree of transparency thereof continuously varied in the manner schematically shown in FIG. 4A in the whole range according to the direction of rotation F21 or F22 around the rotary shaft 41, thereby resolution relating to the adjustment of sensitivity can be increased.

According to the optical sensor of this third embodiment described above, in addition to the above-mentioned effects (1) to (3) of the foregoing first embodiment and the effects similar to the above-mentioned effects (5) and (8) of the foregoing second embodiment, the following effects can be produced.

(9) The light intercepting plate 40b is provided with the diffusion plate 42b made of the semitransparent disk-shaped resin member whose thickness varies continuously in the direction of rotation. With this, along with the rotation of the light intercepting plate 40a, the amount of light incident on the light receiving surface of the light receiving device 20 can be continuously adjusted according to the thickness of the diffusion plate 42b. Hence, it is possible to set or change the sensitivity of the optical sensor with ease and with high accuracy.

Fourth Embodiment

Figure 5A:
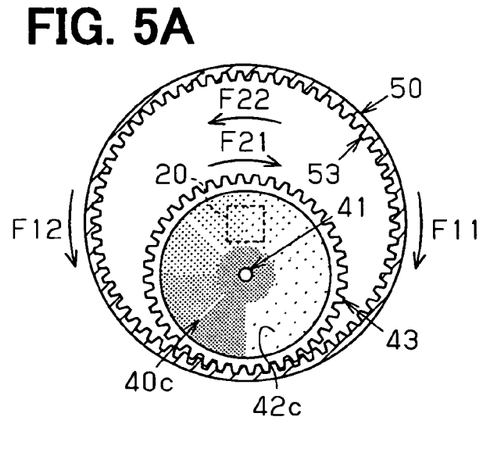

Next, an optical sensor in accordance with the fourth embodiment of the present invention will be described with reference to FIGS. 5A and 5B. Here, a difference of the fourth embodiment with the above-mentioned third embodiment will be mainly described. FIG. 5A is a plan view schematically showing the relationship between a light intercepting plate 40c and an exterior filter 50, which are used for the optical sensor, and FIG. 5B is a perspective view of the structure of the light intercepting plate 40c.

Figure 5B:
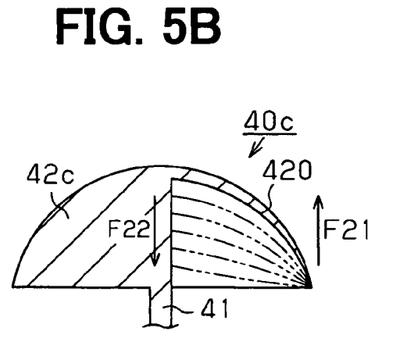
FIG. 5B is a perspective view showing the light intercepting plate of FIG. 5A, according to a fourth embodiment of the present invention.

As shown in these FIGS. 5A and 5B, the optical sensor of this embodiment is basically constructed in a manner similar to the manner in the first embodiment shown in FIG. 1 and FIGS. 2A and 2B and in the foregoing third embodiment shown in FIGS. 4A and 4B. However, in this embodiment, as shown in FIGS. 5A and 5B, the light intercepting plate is provided with a semitransparent dome-shaped resin member 42c. The resin member 42c forming this light intercepting plate 40c is a diffusion dome whose thickness varies continuously in the whole range in the direction of rotation around its rotary shaft.

That is, as shown in FIG. 5B, the diffusion dome (light adjusting mechanism) 42c for forming the light intercepting plate 40c is formed in such a way that the thickness of its internal wall 420 varies continuously, as shown by a double dot and dash line in the drawing, in the whole range in the direction of rotation F21 or F22 around the rotary shaft 41 shown in FIG. 5A. Then, such a diffusion dome 42c is set in a manner shown in FIG. 5A and hence its thickness is made largest, for example, on the lower left side in the drawing of the rotary shaft 41. Hence, in this lower left portion, the amount of light passing through the diffusion dome 42c is made smallest. The thickness of this diffusion dome 42c is made gradually smaller in a direction of arrow shown as the direction of rotation F21 from a starting point on the lower side in the drawing of the rotary shaft 41 and is made smallest on the lower right side in the drawing of the rotary shaft 41.

Hence, in this lower right portion, the amount of light passing though the diffusion dome 42c is made largest. That is, also the light intercepting plate 40c provided with this diffusion dome 42c has the degree of transparency thereof continuously varied in the manner schematically shown in FIG. 5A in the whole range according to the direction of rotation F21 or F22 around the rotary shaft 41, thereby resolution relating to the adjustment of sensitivity as the optical sensor can be increased.

The optical sensor of this fourth embodiment described above can also produce the above-mentioned effects (1) to (3) of the foregoing first embodiment, effects similar to the above-mentioned effects (5) and (8) of the foregoing second embodiment, and effects equal to or similar to the above-mentioned effects (9) of the foregoing third embodiment.

Fifth Embodiment

Figure 6A:
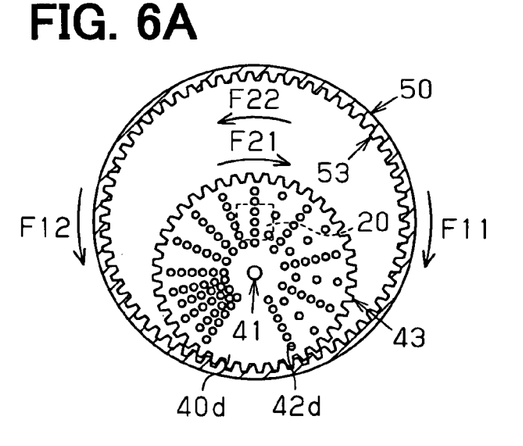

Next, an optical sensor in accordance with the fifth embodiment of the present invention will be described with reference to FIGS. 6A and 6B. Here, a difference of the fifth embodiment with the above-mentioned first embodiment will be mainly described. FIG. 6A is a plan view schematically showing the relationship between a light intercepting plate 40d and an exterior filter 50, which are used for the optical sensor, and FIG. 6B is a perspective view of the structure of the light intercepting plate 40d.

Figure 6B:
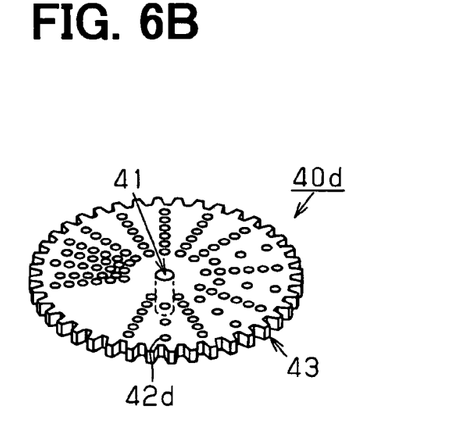
FIG. 6B is a perspective view showing the light intercepting plate of FIG. 6A, according to a fifth embodiment of the present invention.

As shown in these FIGS. 6A and 6B, the optical sensor of this embodiment is also basically constructed in a manner similar to the manner in the foregoing first embodiment shown in FIG. 1 and FIGS. 2A and 2B. However, in this embodiment, as shown in FIGS. 6A and 6B, the light intercepting plate 40d is formed of an opaque disk-shaped plate. In addition, this light intercepting plate 40d has a plurality of through holes 42d for passing light. The through holes 42d are formed in such a manner that the density of arrangement varies stepwise in the whole range larger than 180 degrees in the direction of rotation around its rotary shaft.

That is, as shown in FIG. 6B, the light intercepting plate 40d having the plurality of through holes 42d as a light adjusting mechanism has a structure in which the density of arrangement of these through holes 42d varies stepwise in the direction of rotation around the rotary shaft 41. Then, such a light intercepting plate 40d is set in a manner shown in FIG. 6A and hence the density of arrangement of these through holes 42d is made highest, for example, on the lower left side in the drawing of the rotary shaft 41. Hence, in this lower left portion of the light intercepting plate 40d, the amount of light passing through light intercepting plate 40d is made largest. The density of arrangement of these through holes 42d is made gradually smaller in a direction of arrow shown as the direction of rotation F21 from a starting point on the lower side in the drawing of the rotary shaft 41 and is made smallest on the lower right side in the drawing of the rotary shaft 41. Hence, in this lower right portion of the light intercepting plate 40d, the amount of light passing though the light intercepting plate 40d is made smallest. That is, the density of arrangement of the through holes 42d of the light intercepting plate 40d is varied stepwise in the manner shown in FIG. 6A in the whole range larger than 180 degrees according to the direction of rotation F21 or F22 around the rotary shaft 41, thereby resolution relating to the adjustment of sensitivity as the optical sensor can be increased.

According to the optical sensor of this fifth embodiment described above, in addition to the above-mentioned effects (1) to (3) of the foregoing first embodiment, the following effect can be produced.

(10) The light intercepting plate 40d is formed of an opaque disk-shaped plate. This light intercepting plate 40d has the through holes 42d formed in such a manner that the density of arrangement varies stepwise in the direction of rotation. With this, along with the rotation of the light intercepting plate 40d, the amount of light incident on the light receiving surface of the light receiving device 20 are adjusted stepwise according to the density of arrangement of the through holes 42d for passing light. Hence, it is possible to set or change the sensitivity as the optical sensor with ease and with high accuracy. Moreover, when the light intercepting plate 40d having such through holes 42d as the light adjusting mechanism is realized, for example, punching metal can be used, and thereby the light intercepting plate 40d can be formed with ease.

Sixth Embodiment

Next, an optical sensor in accordance with the sixth embodiment of the present invention will be described with reference to FIGS. 7A and 7B. Here, a difference of the sixth embodiment with the foregoing first to fifth embodiments will be now described.

Figure 7A:
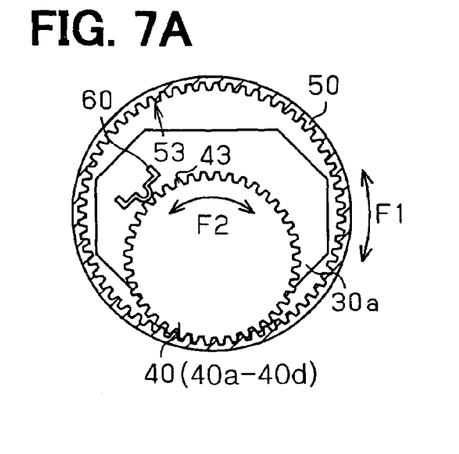
FIGS. 7A and 7B are partial cross-sectional views schematically showing the states of engagement of an engaging portion of an optical sensor with a root and a crest of an external gear of a light intercepting plate of the optical sensor, respectively, in accordance with a sixth embodiment of the present invention.
Figure 7B:
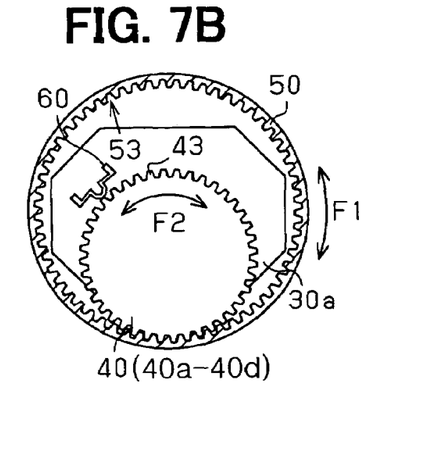

As shown in FIGS. 7A and 7B, in the optical sensor of this embodiment, the basic structure relating to the engagement of the exterior filter and the light intercepting plate is similar to the structures of the first to fifth embodiments shown in FIG. 1 to FIGS. 6A and 6B. However, in this embodiment, as shown in FIGS. 7A and 7B, a holding plate 30a having an engaging portion 60 is provided. The teeth of the external gear 43 are elastically engaged with the engaging portion 60 of the holding plate 30a at a portion other than the engaging portion where the external gear 43 of the light intercepting plate (40a to 40d) is engaged with the internal gear 53 of the exterior filter 50.

Hence, in the optical sensor constructed in this manner, setting or changing the sensitivity can be performed as follows. That is, the exterior filter 50 is rotated clockwise or counterclockwise as shown by arrow F1; and at this time, the light intercepting plate 40 (40a to 40d) is rotated as shown by arrow F2 along with the rotation of the exterior filter 50, thereby the amount of light incident on the light receiving device (not shown) is sequentially adjusted.

However, because of the elastic deformation of the engaging portion 60 itself, there are alternately repeated a state shown in FIG. 7A where the protrusion of the engaging portion 60 formed on the holding plate 30a abuts against the root of the teeth of the external gear 43 and a state shown in FIG. 7B where the protrusion of the engaging portion 60 goes on the crest of the teeth of the external gear 43. For this reason, the light intercepting plate 40 and the exterior filter 50 produces appropriate rotational resistance at the time of the rotational operation for setting or changing the sensitivity of the optical sensor.

According to the optical sensor of this sixth embodiment described above, in addition to the above-mentioned respective effects produced by the foregoing first to fifth embodiments, the new following effect can be produced.

(11) In this embodiment, the holding plate 30a having the engaging portion 60 is elastically engaged with the teeth of the external gear 43 at a portion other than the engaging portion where the external gear 43 of the light intercepting plate (40a to 40d) is engaged with the internal gear 53 of the exterior filter 50. With this, the protrusion of the engaging portion 60 is elastically engaged with the crests and roots of the teeth of the external gear 43 along with the rotation of the light intercepting plate 40 operatively associated with the rotation of the exterior filter 50. Hence, the exterior filter 50 produces appropriate rotational resistance along with the rotational operation. Therefore, when such an optical sensor is mounted in, for example, a vehicle, an unintended change in the sensitivity caused by vibrations or the like of the vehicle can be suppressed. Moreover, for example, when a user sets or changes sensitivity, the user can get an appropriate sense of click.

Seventh Embodiment

Figure 8A:
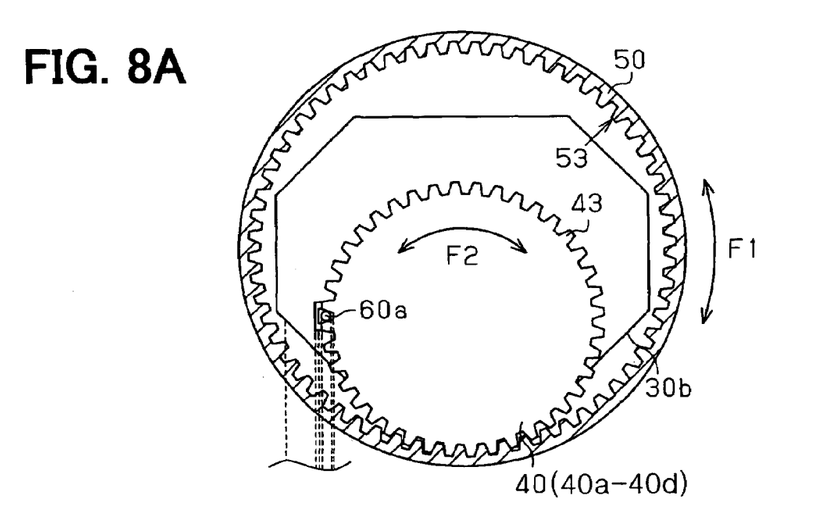
FIG. 8A is a partial cross-sectional view schematically showing the state of engagement of a light intercepting plate with an external gear of an engaging portion of an optical sensor.
Figure 8B:
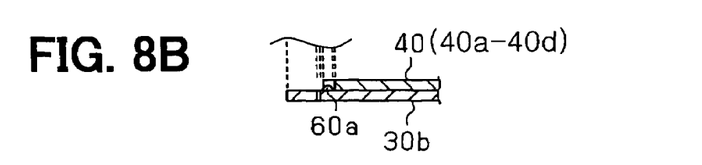
FIGS. 8B and 8C are partial cross-sectional views showing the states of engagement of an engaging portion of an optical sensor with a root and a crest of an external gear of the light intercepting plate of the optical sensor, respectively, in accordance with a seventh embodiment of the present invention.
Figure 8C:
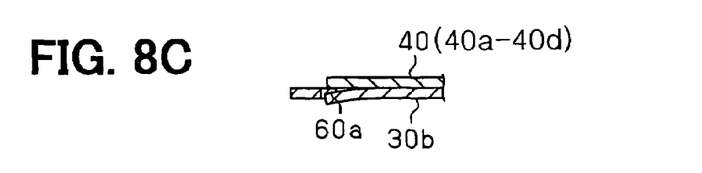

Next, an optical sensor in accordance with the seventh embodiment of the present invention will be described with reference to FIGS. 8A, 8B, and 8C. Here, a difference of the seventh embodiment with the above-mentioned sixth embodiment will be mainly described. FIGS. 8A, 8B, and 8C show an engaging portion 60a employed in the optical sensor. That is, FIG. 8A is a plan view schematically showing the manner of engagement of the light intercepting plate 40 (40a-40d) with the external gear 43, and FIGS. 8B and 8C are side views schematically showing the state where the light intercepting plate 40 (40a-40d) is engaged with and disengaged from the external gear 43.

As shown in FIGS. 8A to 8C, in this embodiment, a holding plate 30b having an engaging portion 60a is engaged elastically from below with the teeth of the external gear 43 at a portion other than a portion where the external gear 43 of the light intercepting plate 40 (40a to 40d) is engaged with the internal gear 53 of the exterior filter 50.

Also in the optical sensor constructed in this manner, when the light intercepting plate 40 (40a to 40d) is rotated in a manner shown by arrow F2 along with the rotation of the exterior filter 50 in the manner shown by arrow F1 according to the setting or changing of sensitivity, the above-mentioned rotational resistance is caused. That is, also in this embodiment, because of the elastic deformation of the engaging portion 60a formed on the holding plate 30b, there are alternately repeated a state shown in FIG. 8B where the engaging portion 60a abuts from below against the root of the teeth of the external gear 43 and a state shown in FIG. 8C where the engaging portion 60a goes on the crest of the teeth of the external gear 43. Hence, also in this case, the user can get appropriate rotational resistance or a sense of click by means of the light intercepting plate 40 and by extension the exterior filter 50 at the time of rotational operation for setting or changing the sensitivity of the optical sensor.

As described above, also by the optical sensor of this seventh embodiment described above, effects equal to or similar to the effects produced by the above-mentioned sixth embodiments can be produced.

The first to seventh embodiments described above can be modified as appropriate, for example, in the manner to be described below.

The sixth or seventh embodiment described above employs a structure in which the holding plate 30a or 30b has the engaging portion 60 or 60a that is elastically engaged with the teeth of the external gear 43 at a portion other than a portion where the external gear 43 of the light intercepting plate 40 (40a to 40d) is engaged with the internal gear 53 of the exterior filter 50 to thereby apply rotational resistance to the light intercepting plate 40 and the exterior filter 50 on the basis of elastic deformation of the engaging portion 60 or 60a. However, the manner of elastic engagement of the engaging portion 60, 60a with the teeth of gears is not limited to this. It is also possible to employ as appropriate a structure. For example, an engaging part of a structure, in which a ball is inserted into the bottom portion of a cylinder having a bottom surface with an opening formed in the center and is pressed by a spring also inserted into the cylinder, is provided. Furthermore, the ball exposed from the bottom surface of the cylinder is elastically engaged with the above-mentioned teeth of gear. Moreover, an object with which the engaging portion is engaged may be the internal gear 53 of the exterior filter 50 in place of the external gear 43 of the light intercepting plate 40. Furthermore, these engaging portions may be used in combination. That is, only when the engaging portion is elastically engaged with the teeth of gear of at least one of the light intercepting plate 40 (40a to 40d) and the exterior filter 50 at a portion other than the portion where these gears are engaged with each other, the other parts can be suitably changed.

The first to fifth embodiments described above employ a structure in which the external gear 43 is formed on the outer peripheral surface of the light intercepting plate 40 (40a to 40d) and in which the internal gear 53 is formed on the inner peripheral surface of the exterior filter 50 and in which the light intercepting plate 40 (40a to 40d) is rotated in accordance with the rotation of the exterior filter 50 on the basis of the engagement of these external gear 43 and internal gear 53. In place of this structure, it is also recommendable to employ a structure in which the outer peripheral surface of the light intercepting plate 40 (40a to 40d) is made to abut against the inner peripheral surface of the exterior filter 50 with a specified coefficient of friction held between them to thereby cause the light intercepting plate 40 (40a to 40d) to follow the rotation of the exterior filter 50.

Eighth Embodiment

Figure 9A:
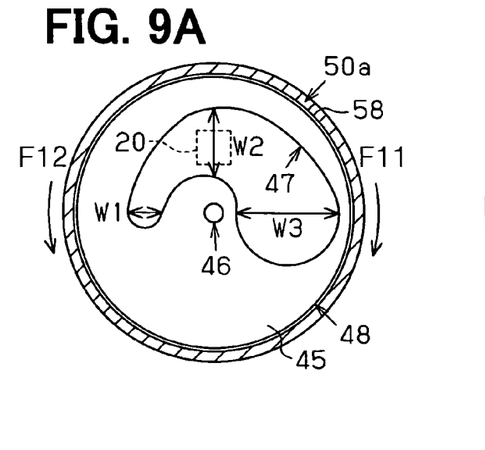

Next, an optical sensor in accordance with the eighth embodiment of the present invention will be described with reference to FIGS. 9A and 9B. Here, a difference of the eighth embodiment with the above-mentioned first embodiment will be mainly described. FIG. 9A is a plan view schematically showing the relationship between a light intercepting plate 45 and an exterior filter 50a, which are used for the optical sensor, and FIG. 9B is a perspective view of the structure of the light intercepting plate 45.

Figure 9B:
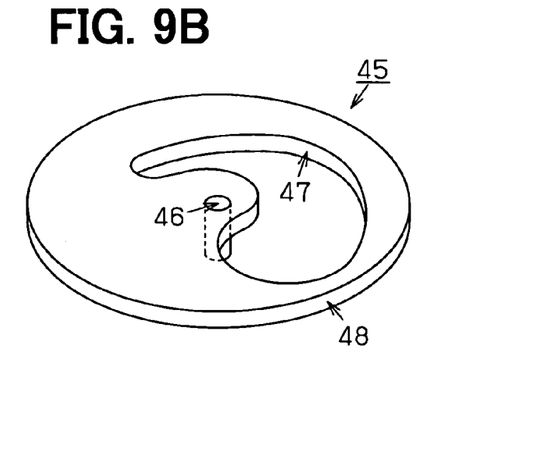
FIG. 9B is a perspective view showing the light intercepting plate of FIG. 9A, according to an eighth embodiment of the present invention.

As shown in these FIGS. 9A and 9B, the optical sensor of this embodiment is also basically constructed in a manner similar to the manner in the foregoing first embodiment shown in FIG. 1 and FIGS. 2A and 2B. However, in this embodiment, as shown in FIGS. 9A and 9B, there is employed a structure in which: the light receiving device 20 is fixed at a biased position; the center of rotation and the radius of rotation of the light intercepting plate 45 are set equal to the center of rotation and the radius of rotation of the exterior filter 50a; and the whole outer peripheral surface of the light intercepting plate 45 is made to abut against the inner peripheral surface of the exterior filter 50a with a specified coefficient of friction held between them.

More specifically, as shown in FIG. 9A, a slit 47 formed in the light intercepting plate 45 is formed in a shape such that its width increases in order of W1→W2→W3 continuously around the center of the rotary shaft 46 from the left side to the upper side and further to the right side in the drawing. In these three kinds of widths W1, W2, and W3, the slit width W1 is narrower than the width of light receiving surface of the light receiving device 20, and the slit width W2 is nearly equal to the width of light receiving surface of the light receiving device 20, and the slit width W3 is wider than the width of light receiving surface of the light receiving device 20. The slit 47 is formed in a range larger than 180 degrees in the direction of rotation F11 or F12 around the rotary shaft 46 to thereby increase resolution relating to the adjustment of sensitivity as the optical sensor.

As is evident from FIG. 9A, the center of rotation (rotary shaft 46) and the radius of rotation of the light intercepting plate 45 are set equal to the center of rotation and the radius of rotation of the exterior filter 50a, and the whole outer peripheral surface 48 of the light intercepting plate 45 is made to abut against the inner peripheral surface 58 of the exterior filter 50a with a specified coefficient of friction held between them. For this reason, the rotation of the exterior filter 50a is cooperatively associated with the rotation of the light intercepting plate 45 by the action of a specified frictional force developed between the outer peripheral surface of the light intercepting plate 45 and the inner peripheral surface of the exterior filter 50a.

According to the optical sensor of this eighth embodiment, the following excellent effects can be produced.

(1) The light intercepting plate 45 is provided with the slit 47 constructing a light adjusting mechanism in a range larger than 180 degrees in the direction of rotation around the rotary shaft 46. With this, for example, the slit 47 is formed in the light intercepting plate 45 in a wide range larger than 180 degrees. Hence, resolution relating to the adjusting or changing of the sensitivity as the optical sensor with respect to the amount of rotation of the exterior filter 50a can be significantly increased.

(2) The light receiving device 20 fixed at a biased position, and the center of rotation and the radius of rotation of the light intercepting plate 45 (rotary shaft 46) are set equal to the center of rotation and the radius of rotation of the exterior filter 50a. With this, the amount of rotation around the center of rotation of the exterior filter 50a is basically equal to the amount of rotation around the rotary shaft 46 of the light intercepting plate 45. Hence, the above-mentioned effect (1) of the eighth embodiment, that is, increased resolution can be directly produced. Hence, the optical sensor of this eighth embodiment is effective, in particular, in the accuracy of adjustment of sensitivity. Moreover, because the exterior filter 50a can be arranged nearly in the same size of the light intercepting plate 45 and coaxially with the light intercepting plate 45, the optical sensor can be reduced in size.

(3) The slit 47 is formed in such a way as to continuously adjust the amount of light incident on the light receiving surface of the light receiving device 20 along with the rotation around the rotary shaft 46 of the light intercepting plate 45. With this, a specified relationship can be set between the degree of change in the sensitivity of the optical sensor and the rotation of the exterior filter 50a. Hence, the user can set or change the sensitivity as the optical sensor continuously and easily.

(4) The light intercepting plate 45 can be formed by a simple construction in which the slit 47 is only formed in the opaque disk-shaped plate in the above-described manner. Hence, the light intercepting plate 45 can be easily realized.

Ninth Embodiment

Figure 10A:
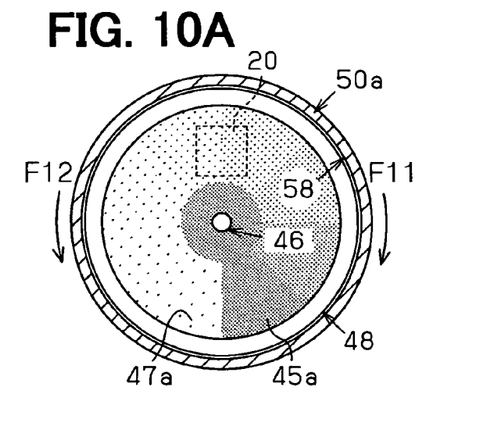

Next, an optical sensor in accordance with the ninth embodiment of the present invention will be described with reference to FIGS. 10A and 10B. Hear, a difference of the ninth embodiment with the above-mentioned eighth embodiment will be mainly described. FIG. 10A is a plan view schematically showing the relationship between a light intercepting plate 45a and an exterior filter 50a, which are used for the optical sensor, and FIG. 10B is a perspective view of the structure of the light intercepting plate 45a.

Figure 10B:
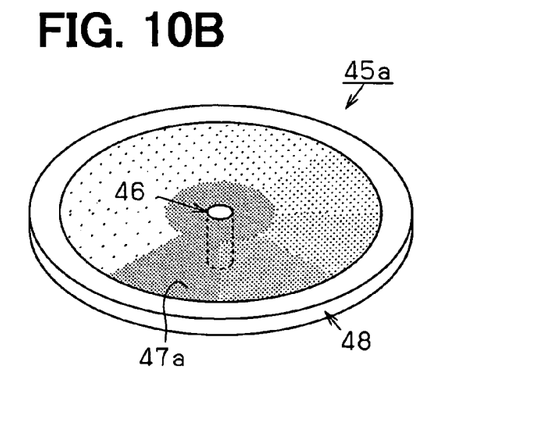
FIG. 10B is a perspective view showing the light intercepting plate of FIG. 10A, according to a ninth embodiment of the present invention.

As shown in these FIGS. 10A and 10B, the optical sensor of this embodiment is also basically constructed in a manner similar to the manner in the first embodiment shown in FIG. 1 and FIGS. 2A and 2B and the foregoing eighth embodiment shown in FIGS. 9A and 9B. However, in this embodiment, as shown in FIGS. 10A and 10B, the light intercepting plate 45a is provided with a semitransparent disk-shaped film member 47a. The film member 47a forming this light intercepting plate 45a has the degree of transparency set in a manner continuously varying in a whole range in the direction of rotation around its rotary shaft.

More specifically, as shown in FIG. 10A, the film member (light adjusting mechanism) 47a has the degree of transparency set highest, for example, on the lower left side in the drawing of the rotary shaft 46. Hence, in this lower left portion of the film member 47a, the amount of light passing through the film member 47a is made largest. The degree of transparency of this film member 47a is set gradually lower in a direction of arrow shown as the direction of rotation F11 from a starting point at the lower side in the drawing of the rotary shaft 46 and is set lowest at the lower right side in the drawing of the rotary shaft 46. Hence, in this lower right portion of the film member 47a, the amount of light passing though the film member 47a is made smallest. That is, the light intercepting plate 45a provided with this film member 47a has the degree of transparency thereof continuously varied in the manner schematically shown in FIG. 10A in the whole range according to the direction of rotation F11 or F12 around the rotary shaft 46, thereby resolution relating to the adjustment of sensitivity of the optical sensor can be increased.

Moreover, as described above, the film member 47a has the degree of transparency thereof varied continuously in the whole range in the direction of rotation around the rotary shaft 46. Hence, the range where the degree of interception of light can be adjusted in the light intercepting plate 45a can be utilized to a maximum extent, thereby a wide dynamic range as the optical sensor can be secured.

According to the optical sensor of this ninth embodiment described above, in addition to the above-mentioned effects (1) to (3) of the foregoing eighth embodiment, the new following effects can be produced.

(5) The light intercepting plate 45a is provided with the film member 47a constructing the light adjusting mechanism in the whole range in the direction of rotation around the rotary shaft 46 of the light intercepting plate 45a. With this, the range where the light intercepting plate 45a can be used can be utilized to a maximum extent, thereby a wide dynamic range as the optical sensor can be secured.

(6) The light intercepting plate 45a is provided with the film member 47a having the degree of transparency set in a manner continuously varying in the direction of rotation around its rotary shaft 46. With this, along with the rotation of the light intercepting plate 45a, the amount of light incident on the light receiving surface of the light receiving device 20 can be continuously adjusted according to the degree of transparency of the film member 47a. Hence, it is possible to set or change the sensitivity as the optical sensor with ease and with high accuracy.

(7) Moreover, the use of such a film member 47a can reduce the weight of the light intercepting plate 45a, thereby reducing the weight of the optical sensor.

(8) In addition, the optical sensor is so constructed as to always receive incident light on the whole light receiving surface of the light receiving device 20. Hence, it is possible to set or change sensitivity without changing the directivity of the optical sensor.

Tenth Embodiment

Figure 11A:
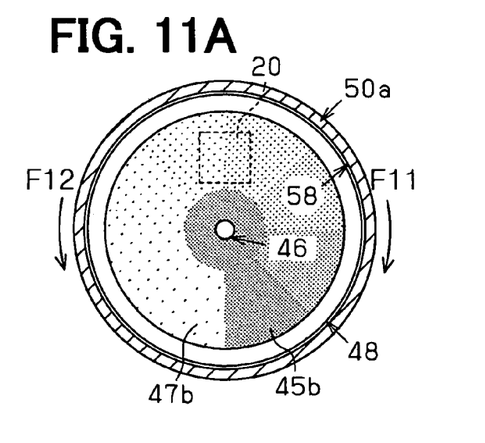

Next, an optical sensor in accordance with the tenth embodiment of the present invention will be described with reference to FIGS. 11A and 11B. Here, a difference of the tenth embodiment with the above-mentioned ninth embodiment will be mainly described. FIG. 11A is a plan view schematically showing the relationship between a light intercepting plate 45b and an exterior filter 50a, which are used for the optical sensor, and FIG. 11B is a perspective view of the structure of the light intercepting plate 45b.

Figure 11B:
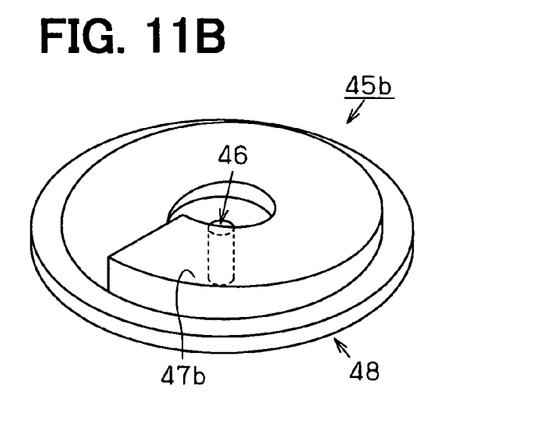
FIG. 11B is a perspective view showing the light intercepting plate of FIG. 11A, according to a tenth embodiment of the present invention.

As shown in these FIGS. 11A and 11B, the optical sensor of this embodiment is also basically constructed in a manner similar to the manner in the first embodiment and in the ninth embodiment. However, in this embodiment, as shown in FIGS. 11A and 11B, the light intercepting plate 45b is formed of a semitransparent disk-shaped resin member. The resin member forming this light intercepting plate 45b is a diffusion plate whose thickness varies continuously in the whole range in the direction of rotation around its rotary shaft.

More specifically, as shown in FIG. 11B, the diffusion plate (light adjusting mechanism) 47b is formed in such a way that its thickness varies continuously in the direction of rotation around the rotary shaft 46. Then, the diffusion plate 47b is set in a manner shown in FIG. 11A and hence its thickness is made smallest, for example, on the lower left side in the drawing of the rotary shaft 46. Hence, in this lower left portion of FIG. 11A, the amount of light passing through the diffusion plate 47b is made largest. The thickness of this diffusion plate 47b is made gradually larger in a direction of arrow shown as the direction of rotation F11 from a starting point on the lower side in the drawing of the rotary shaft 46 and is made largest on the lower right side in the drawing of the rotary shaft 46. Hence, in this lower right portion of FIG. 11A, the amount of light passing though the diffusion plate 47b is made smallest. That is, the light intercepting plate 45b provided with this diffusion plate 47b has the degree of transparency thereof continuously varied in the manner schematically shown in FIG. 11A in the whole range according to the direction of rotation F11 or F12 around the rotary shaft 46, thereby resolution relating to the adjustment of sensitivity can be enhanced.

According to the optical sensor of this tenth embodiment described above, in addition to the above-mentioned effects (1) to (3) of the foregoing eighth embodiment and effects similar to the above-mentioned effects (5) and (8) of the foregoing ninth embodiment, the new following effects can be produced.

(9) The light intercepting plate 45b is formed of the diffusion plate 47b made of the semitransparent disk-shaped resin member whose thickness varies continuously in the direction of rotation. With this, along with the rotation of the light intercepting plate 45b, the amount of light incident on the light receiving surface of the light receiving device 20 can be continuously adjusted according to the thickness of the diffusion plate 47b. Hence, it is possible to set or change the sensitivity as the optical sensor with ease and with high accuracy.

Eleventh Embodiment

Figure 12A:
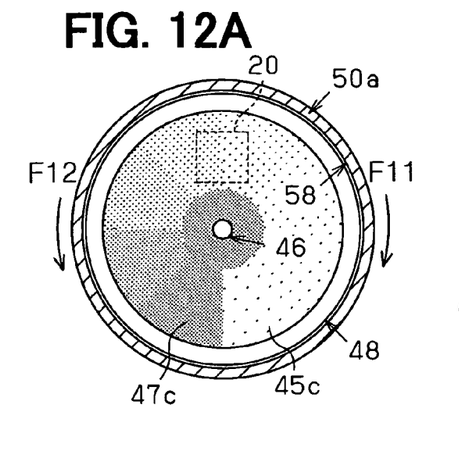

Next, an optical sensor in accordance with the eleventh embodiment of the present invention will be described with reference to FIGS. 12A and 12B. Here, a difference of the eleventh embodiment with the above-mentioned tenth embodiment will be mainly described. FIG. 12A is a plan view schematically showing the relationship between a light intercepting plate 45c and an exterior filter 50a, which are used for the optical sensor, and FIG. 12B is a perspective view of the structure of the light intercepting plate 45c.

Figure 12B:
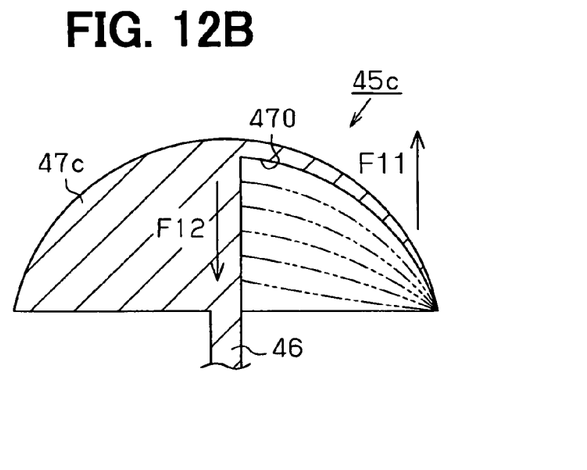
FIG. 12B is a perspective view showing the light intercepting plate of FIG. 12A, according to an eleventh embodiment of the present invention.

As shown in these FIGS. 12A and 12B, the optical sensor of this embodiment is also basically constructed in a manner similar to the manner in the first embodiment and in the tenth embodiment. However, in the tenth embodiment, as shown in FIGS. 12A and 12B, the light intercepting plate 45c is provided with a semitransparent dome-shaped resin member. The resin member for forming this light intercepting plate is a diffusion dome 47c whose thickness varies continuously in the whole range in the direction of rotation around its rotary shaft.

That is, as shown in FIG. 12B, the diffusion dome (light adjusting mechanism) 47c for forming the light intercepting plate 45c is formed in such a way that the thickness of its internal wall 470 varies continuously, as shown by a double dot and dash line in the drawing, in the whole range in the direction of rotation F11 or F12 around the rotary shaft 46 shown in FIG. 12A. Then, such diffusion dome 47c is set in a manner shown in FIG. 12A and hence its thickness is made largest, for example, on the lower left side in the drawing of the rotary shaft 46. Hence, in this lower left portion of FIG. 12A, the amount of light passing through the diffusion dome 47c is made smallest. The thickness of this diffusion dome 47c is made gradually smaller in a direction of arrow shown as the direction of rotation F11 from a starting point on the lower side in the drawing of the rotary shaft 46 and is made smallest on the lower right side in the drawing of the rotary shaft 46. Hence, in this lower right portion of FIG. 12A, the amount of light passing though the diffusion dome 47c is made largest. That is, the light intercepting plate 45c provided with this diffusion dome 47c has the degree of transparency thereof continuously varied in the manner schematically shown in FIG. 12A in the whole range according to the direction of rotation F11 or F12 around the rotary shaft 46, thereby resolution relating to the adjustment of sensitivity can be increased.

Also the optical sensor of this eleventh embodiment described above, can produce the above-mentioned effects (1) to (3) of the foregoing eighth embodiment, effects similar to the above-mentioned effects (5) and (8) of the foregoing ninth embodiment, and effects equal to or similar to the above-mentioned effects (9) of the foregoing tenth embodiment.

Twelfth Embodiment

Figure 13A:
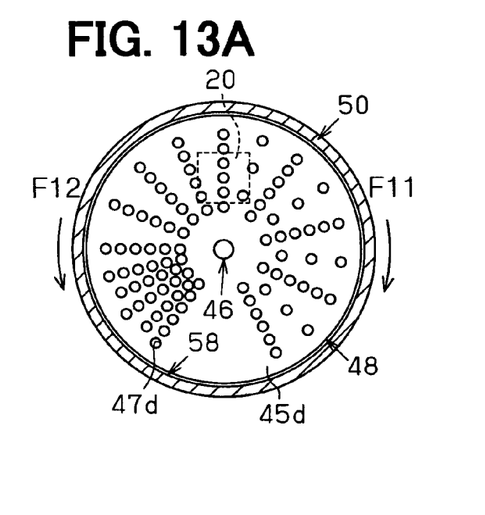

Next, an optical sensor in accordance with the twelfth embodiment of the present invention will be described with reference to FIGS. 13A and 13B. Here, a difference of the twelfth embodiment with the above-mentioned eighth embodiment will be mainly described. FIG. 13A is a plan view schematically showing the relationship between a light intercepting plate 45d and an exterior filter 50, which are used for the optical sensor, and FIG. 13B is a perspective view of the structure of the light intercepting plate 45d.

Figure 13B:
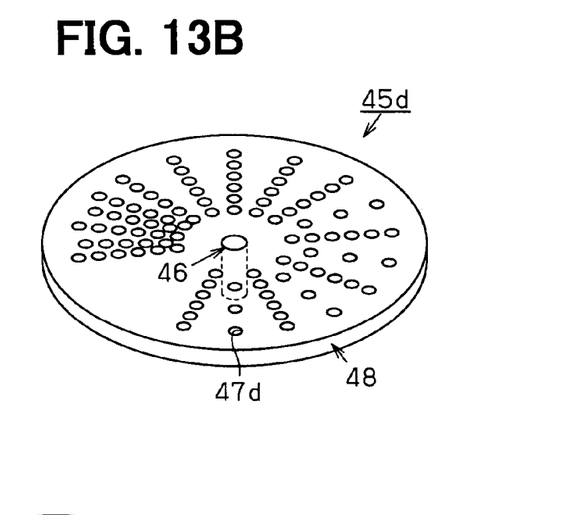
FIG. 13B is a perspective view showing the light intercepting plate of FIG. 13A, according to a twelfth embodiment of the present invention.

As shown in these FIGS. 13A and 13B, the optical sensor of this embodiment is basically constructed in a manner similar to the manner in the fifth embodiment and in the eighth embodiment. In this embodiment, as shown in FIGS. 13A and 13B, a light intercepting plate 45d is formed of an opaque disk-shaped plate. In this light intercepting plate, a plurality of through holes 47d for passing light are formed in such a manner that the density of arrangement varies stepwise in the direction of rotation around its rotary shaft.

That is, as shown in FIG. 13B, the light intercepting plate 45d having the plurality of through holes 47d as a light adjusting mechanism has a structure in which the density of arrangement of these through holes 47d varies stepwise in the direction of rotation around the rotary shaft 46. Then, the light intercepting plate 45d is set in a manner shown in FIG. 13A and hence the density of arrangement of these through holes 47d is made highest, for example, on the lower left side in the drawing of the rotary shaft 46. Hence, in this lower left portion of FIG. 13A, the amount of light passing through light intercepting plate 45d is made largest. The density of arrangement of these through holes 47d is made gradually smaller in a direction of arrow shown as the direction of rotation F11 from a starting point on the lower side in the drawing of the rotary shaft 46 and is made smallest on the lower right side in the drawing of the rotary shaft 46. Hence, in this lower right portion of FIG. 13A, the amount of light passing though the light intercepting plate 45d and reaching the light receiving device 20 is made smallest. That is, the density of arrangement of the through holes 47d of the light intercepting plate 45d is varied stepwise in the manner shown in FIG. 13A in a wide range according to the direction of rotation F11 or F12 around the rotary shaft 46, thereby resolution relating to the adjustment of sensitivity can be increased.

According to the optical sensor of this twelfth embodiment described above, in addition to the above-mentioned effects (1) to (3) of the foregoing eighth embodiment, the new following effect can be produced.

(10) The light intercepting plate 45d is formed of the opaque disk-shaped plate. This light intercepting plate 45d has the through holes 47d formed in such a manner that the density of arrangement thereof varies stepwise in the direction of rotation. With this, along with the rotation of the light intercepting plate 45d, the amount of light incident on the light receiving surface of the light receiving device 20 is adjusted stepwise according to the density of arrangement of the through holes 47d for passing light. Hence, it is possible to set or change the sensitivity as the optical sensor with ease and with high accuracy. Moreover, because the light intercepting plate 45d having such through holes 47d as the light adjusting mechanism can be formed by punching, the light intercepting plate 45d can be realized with ease.

Moreover, the eighth to twelfth embodiments described above can be also modified as appropriate, for example, in the manner to be described below.

In the eighth to twelfth embodiments described above, the center of rotation and the radius of rotation of the light intercepting plate 45 (45a to 45d) are set equal to the center of rotation and the radius of rotation of the exterior filter 50a. Further, the whole outer peripheral surface 48 of the light intercepting plate 45 (45a-45d) is made to abut against the inner peripheral surface 58 of the exterior filter 50a with a specified coefficient of friction held between them. However, the light intercepting plate 45 (45a-45d) may be formed integrally with the exterior filter 50a as the internal mechanism of the exterior filter 50a. With this, the amount of rotation of the exterior filter 50a can be made completely equal to the amount of rotation of the light intercepting plate 45.

Other Embodiments

Although the present invention has been fully described in connection with the preferred embodiments thereof with reference to the accompanying drawings, it is to be noted that various changes and modifications will become apparent to those skilled in the art.

For example, each of the above-mentioned respective embodiments is provided with the holding plate 30 or 30a having the shaft hole 31, through which the rotary shaft 41 or 46 for supporting the light intercepting plate 40 (40a to 40d) or the light intercepting plate 45 (45a to 45d) is inserted, and the circular through hole, which is formed in correspondence to the light receiving surface of the light receiving device 20 and passes light transmitted by the light intercepting plate. However, when the shaft hole 31 and the engaging portions 60, 60a (refer to FIGS. 7A and 7B and FIGS. 8A and 8B) are formed in the top surface 10a of the sensor housing 10, it is possible to employ a construction in which the holding plate 30 or 30a is omitted. Conversely, the rotary shaft 41 or 46 may be provided on the holding plate 30, 30a or the top surface 10a of the sensor housing 10, and its bearing may be formed on the light intercepting plate 40 or 45.

Each of the above-mentioned respective embodiments, except for the seventh and twelfth embodiments, is provided with a structure in which the light adjusting function of the light adjusting mechanism varies continuously in the direction of rotation of the light intercepting plate 40 (40a to 40c) or the light intercepting plate 45 (45a to 45c). However, the light adjusting mechanism may have a structure in which the light adjusting function varies stepwise.

In the above-mentioned respective embodiments, the light intercepting plate 40 (40a to 40d) or the light intercepting plate 45 (45a to 45d) has its shaft freely rotatably supported on the light receiving surface of the light receiving device 20, but the structure of supporting the light intercepting plate is not limited to this. That is, only when the light intercepting plate has its shaft supported in the range of angle of rotation which is larger than, for example, 180 degrees in the direction of rotation around the rotary shaft of the light intercepting plate and when the light adjusting function of the light adjusting mechanism is satisfied, the structure can be suitably changed.

Such changes and modifications are to be understood as being within the scope of the present invention as defined by the appended claims.

What is claimed is:

1. An optical sensor comprising:
    a housing;
    a light receiving device disposed in the housing;
    an exterior filter rotatably mounted to an attachment surface of the housing; and
    a light intercepting member which rotates along with a rotation of the exterior filter to adjust an amount of light incident on a light receiving surface of the light receiving device,
    wherein the light intercepting member has a rotary shaft, the rotary shaft being fixed at a center portion of the light intercepting member, and has a light adjusting mechanism for adjusting the amount of light incident on the light receiving surface of the light receiving device in a range in a direction of rotation around the rotary shaft,
    wherein the center portion of the light intercepting member is biased from a center of rotation of the exterior filter,
    wherein a radius of rotation of the exterior filter is larger than a radius of rotation of the light intercepting member.

2. The optical sensor according to claim 1, wherein the shaft of the light intercepting member is rotatably supported on the light receiving surface of the light receiving device.

3. The optical sensor according to claim 1, wherein the light adjusting mechanism is provided in the whole range in a direction of rotation round the rotary shaft of the light intercepting member.

4. The optical sensor according to claim 1, wherein the light adjusting mechanism is provided to adjust the amount of light incident on the light receiving surface of the light receiving device continuously or stepwise along with rotation of the light intercepting member.

5. The optical sensor according to claim 4, wherein:
the light intercepting member includes an opaque disk-shaped plate; and
the light adjusting mechanism is constructed with a slit formed through the disk-shaped plate and for passing light such that a slit width of the slit is varied continuously or stepwise in a direction of rotation of the opaque disk-shaped plate.

6. The optical sensor according to claim 4, wherein:
the light intercepting member includes a semitransparent disk-shaped film member; and
the light adjusting mechanism is provided in such a manner that the film member has a degree of transparency varied continuously or stepwise in a direction of rotation of the film member.

7. The optical sensor according to claim 4, wherein:
the light intercepting member includes a semitransparent disk-shaped resin member; and
the light adjusting mechanism is provided in such a maimer that the disk-shaped resin member has its thickness varied continuously or stepwise in a direction of rotation of the resin member.

8. The optical sensor according to claim 4, wherein:
the light intercepting member includes a semitransparent dome-shaped resin member; and
the light adjusting mechanism is provided in such a manner that the semitransparent dome-shaped resin member has its thickness on an inner side varied continuously or stepwise in a direction of rotation of the resin member.

9. The optical sensor according to claim 4, wherein:
the light intercepting member includes an opaque disk-shaped plate having through holes which penetrate through the opaque disk-shaped plate to pass light; and
the light adjusting mechanism is provided in such a manner that the through holes are varied in a density of arrangement continuously or stepwise in a direction of rotation of the opaque disk-shaped plate.

10. The optical sensor according to claim 1, wherein an outer peripheral surface of the light intercepting member abuts against an inner peripheral surface of the exterior filter with a specified coefficient of friction between them.

11. The optical sensor according to claim 1, further comprising:
an external gear provided on an outer peripheral surface of the light intercepting member; and
an internal gear provided on an inner peripheral surface of the exterior filter,
wherein the light intercepting member rotates along with rotation of the exterior filter on the basis of engagement of the external gear with the internal gear.

12. The optical sensor according to claim 11, further comprising
an engaging member that is elastically engaged with teeth of at least one of the external gear of the light intercepting member and the internal gear of the exterior filter at a portion other than a portion where the external gear is engaged with the internal gear.

13. The optical sensor according to claim 1, wherein the light intercepting member has a center of rotation and the radius of rotation that are approximately equal to the center of rotation and the radius of rotation of the exterior filter, respectively.

14. The optical sensor according to claim 13, wherein the whole outer peripheral surface of the light intercepting member abuts against an inner peripheral surface of the exterior filter with a specified coefficient of friction between them.

15. The optical sensor according to claim 13, wherein the light intercepting member is formed integrally with the exterior filter as an internal mechanism of the exterior filter.

16. The optical sensor according to claim 1, wherein the exterior filter is rotatably mounted on a top surface of the housing.

17. The optical sensor according to claim 1, wherein
the light intercepting member has a first engagement portion on an outer peripheral surface thereof that is engaged with a second engagement portion on an inner peripheral surface of the exterior filter; and
the light intercepting member is rotated in accordance with the rotation of the exterior filter by the engagement between the first and second engagement portions.

18. The optical sensor according to claim 1, wherein
the light intercepting member has an external gear on an outer peripheral surface thereof;
the exterior filter has an internal gear formed on an inner peripheral surface thereof, the internal gear being rotatably engaged with the external gear.

* * * * *